United States Patent
Hirotani et al.

(10) Patent No.: US 11,945,377 B2
(45) Date of Patent: Apr. 2, 2024

(54) VEHICLE EXTERIOR PART

(71) Applicant: TOYODA GOSEI CO., LTD., Kiyosu (JP)

(72) Inventors: Kozo Hirotani, Kiyosu (JP); Hiroyuki Nakano, Kiyosu (JP); Yasushi Niimi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 271 days.

(21) Appl. No.: 17/571,915

(22) Filed: Jan. 10, 2022

(65) Prior Publication Data
US 2022/0219623 A1 Jul. 14, 2022

(30) Foreign Application Priority Data

Jan. 13, 2021 (JP) ................................ 2021-003670

(51) Int. Cl.
*G09F 21/04* (2006.01)
*B60R 13/00* (2006.01)
*H05B 3/84* (2006.01)

(52) U.S. Cl.
CPC ............. *B60R 13/005* (2013.01); *H05B 3/84* (2013.01)

(58) Field of Classification Search
CPC ...... G09F 21/048; B60R 13/005; B60R 13/04
See application file for complete search history.

(56) References Cited

U.S. PATENT DOCUMENTS

| | | | | |
|---|---|---|---|---|
| 6,674,392 B1 * | 1/2004 | Schmidt | ................ | G01S 13/931 343/873 |
| 9,889,798 B1 * | 2/2018 | Cong | ..................... | G08G 1/166 |
| 11,370,366 B2 * | 6/2022 | Hirotani | .................... | H05B 3/02 |
| 11,603,051 B2 * | 3/2023 | Hirotani | ................ | G09F 21/048 |
| 11,650,289 B2 * | 5/2023 | Hirotani | ............... | H01Q 1/3233 342/70 |

(Continued)

FOREIGN PATENT DOCUMENTS

| | | |
|---|---|---|
| JP | S59-166479 U | 11/1984 |
| JP | 2005-082090 A | 3/2005 |

(Continued)

OTHER PUBLICATIONS

Office Action dated Aug. 8, 2023 issued in corresponding Japanese Patent Application No. 2021-003670 (and English machine translation).

*Primary Examiner* — Shin H Kim
(74) *Attorney, Agent, or Firm* — POSZ LAW GROUP, PLC

(57) ABSTRACT

A vehicle exterior part includes a decorative body, a heater sheet, a connector pin. The decorative body includes a base material, and a transparent resin layer. The heater sheet includes a heat generating body, and an extending portion. A part of the heater wire in the extending portion is joined to the connector pin inside an outer periphery of the base material by a joining portion made of a conductive material. The outer periphery is formed with a window configured to join the heater wire to the connector pin by the joining portion in a state where a joining position is exposed to an outside of the outer periphery. The window is provided with a waterstop portion configured to restrict water from entering the joining position. The waterstop portion is formed by filling the window with a potting material.

3 Claims, 4 Drawing Sheets

(56) References Cited

U.S. PATENT DOCUMENTS

| | | | |
|---|---|---|---|
| 2005/0077737 | A1 | 4/2005 | Komiyama et al. |
| 2005/0115943 | A1* | 6/2005 | Winter .................. B60S 1/0848 |
| | | | 219/202 |
| 2006/0227056 | A1* | 10/2006 | Brittingham ........... B64D 15/12 |
| | | | 343/704 |
| 2014/0138368 | A1* | 5/2014 | Verstraeten ............ B01D 53/00 |
| | | | 219/202 |
| 2015/0183431 | A1* | 7/2015 | Nanami .............. B60W 30/095 |
| | | | 701/301 |
| 2015/0344031 | A1* | 12/2015 | Weisswange .......... G08G 1/165 |
| | | | 701/1 |
| 2016/0111776 | A1* | 4/2016 | Okumura ............... H01Q 1/422 |
| | | | 343/872 |
| 2016/0171893 | A1* | 6/2016 | Chen ................... G08G 1/0112 |
| | | | 701/300 |
| 2017/0352163 | A1* | 12/2017 | Mottin ...................... G06T 7/70 |
| 2017/0352938 | A1* | 12/2017 | Okumura ............... H01Q 1/425 |
| 2018/0070411 | A1* | 3/2018 | Wei .......................... H05B 3/84 |
| 2018/0075320 | A1* | 3/2018 | Zermas ................... G08G 1/04 |
| 2018/0121750 | A1* | 5/2018 | Borkowski .......... G05D 1/0257 |
| 2019/0232886 | A1* | 8/2019 | Okumura ................. H01Q 1/02 |
| 2020/0371203 | A1* | 11/2020 | Hirotani ................ G01S 13/931 |
| 2021/0155168 | A1 | 5/2021 | Hirotani et al. |
| 2021/0159592 | A1 | 5/2021 | Kawashima et al. |
| 2021/0370849 | A1* | 12/2021 | Yamada ................. H05B 3/286 |
| 2022/0314899 | A1 | 10/2022 | Hirotani et al. |

FOREIGN PATENT DOCUMENTS

| | | |
|---|---|---|
| JP | 2020-005057 A | 1/2020 |
| JP | 2020-021591 A | 2/2020 |
| JP | 2021-188917 A | 12/2021 |

\* cited by examiner

VEHICLE EXTERIOR PART

CROSS-REFERENCE TO RELATED APPLICATIONS

This application is based on and claims priority under 35 USC 119 from Japanese Patent Application No. 2021-003670 filed on Jan. 13, 2021.

TECHNICAL FIELD

The present specification relates to a vehicle exterior part for decorating a vehicle, such as an emblem, an ornament, or a mark.

BACKGROUND ART

In a vehicle which incorporates a millimeter wave radar device, a millimeter wave is transmitted from the device toward the outside of the vehicle. When the millimeter wave is reflected by an object outside the vehicle, such as a preceding vehicle or a pedestrian, the reflected millimeter wave is received by the millimeter wave radar device. Transmission and reception of the millimeter wave enable recognition of the object and detection of a distance, a relative speed, and the like between the vehicle and the object.

The vehicle has a vehicle exterior part such as an emblem disposed in front of the millimeter wave radar device in a transmission direction of the millimeter wave. The vehicle exterior part is provided with a decorative body which hides the millimeter wave radar device and has permeability of millimeter wave. The decorative body includes a base material and a transparent resin layer disposed on an exterior side from the base material.

Such vehicle exterior part has a problem that when ice and snow adhere to a design surface (exterior surface) thereof, the millimeter wave is attenuated, which decreases detection performance of the millimeter wave radar device. Therefore, it has been considered to add a snow melting function to the vehicle exterior part. The snow melting function is added by, for example, providing a heater sheet and a connector pin to the decorative body.

The heater sheet is formed by wiring a heater wire, which generates heat when energized, on an interior surface of a sheet base material. The heater sheet includes a heat generating body disposed on an exterior side from the transparent resin layer, and an extending portion extending from a peripheral edge of the heat generating body and disposed on an interior side of the transparent resin layer.

The connector pin is a portion to be coupled with a device for power supply. A part of the heater wire in the extending portion is joined to the connector pin inside the outer periphery of the base material by a joining portion made of a conductive material, so that the connector pin and the heater wire are electrically connected.

According to the vehicle exterior part, the electric power supplied from the device is supplied to the heater wire via the connector pin, so that the heater wire generates heat. Therefore, even if ice and snow adhere to the design surface (exterior surface) of the vehicle exterior part, it is possible to melt the ice and snow by the heat generated by the heater wire, thereby preventing the millimeter wave from being attenuated due to the adhesion of the ice and snow.

For example, JP-A-2020-5057 describes a technique of laminating a heater sheet on an exterior side of the decorative body.

The vehicle exterior part has a window for joining the heater wire to the connector pin by the joining portion. The window is formed in the outer periphery of the base material in a state where a joining position is exposed to the outside of the outer periphery. The window is provided with a waterstop portion for restricting water from entering the joining position.

However, if the ambient temperature changes repeatedly after the vehicle exterior part is assembled to the vehicle, the following problem may occur depending on the structure of the waterstop portion. This problem may occur, for example, if the waterstop portion is formed by filling the window with a hard resin material and the waterstop portion is in contact with the joining portion and the heater wire. That is, when the temperature changes repeatedly, the waterstop portion tends to expand and contract more than the heater wire, and stress is concentratedly applied to a boundary between the joining portion and the heater wire. As a result, the joining of the heater wire to the connector pin by the joining portion may be released, which causes disconnection.

Such a problem is not limited to the millimeter wave radar device, and may similarly occur as long as it is a vehicle exterior part incorporated in a vehicle equipped with a device for transmitting and receiving electromagnetic wave for detecting an object outside the vehicle, and provided with a heater sheet on the exterior side of the decorative body. The same phenomenon as described above may also occur in a vehicle exterior part incorporated in a vehicle without being equipped with a device for transmitting and receiving electromagnetic wave, and provided with a heater sheet on the exterior side of the decorative body.

SUMMARY OF INVENTION

According to an aspect of the present specification, a vehicle exterior part includes; a decorative body configured to decorate a vehicle; a heater sheet including a heater wire configured to generate heat when energized, the heater wire being wired on an interior surface of a sheet base material; and a connector pin configured to be coupled with a device for power supply. The decorative body includes a base material and a transparent resin layer disposed on an exterior side from the base material. The heater sheet includes a heat generating body disposed on an exterior side from the transparent resin layer, and an extending portion extending from a peripheral edge of the heat generating body and disposed on an interior side from the transparent resin layer. A part of the heater wire in the extending portion is joined to the connector pin inside the outer periphery of the base material by a joining portion made of a conductive material. The outer periphery is formed with a window configured to join the heater wire to the connector pin by the joining portion. The window is formed in a state where a joining position is exposed to an outside of the outer periphery. The window is provided with a waterstop portion configured to restrict water from entering the joining position. The waterstop portion is formed by filling the window with a potting material.

According to the above configuration, the waterstop portion which blocks the window is formed by filling the window with a potting material. The potting material is in close contact with a wall surface of the window. Therefore, the waterstop portion can restrict water from the outside of the window from entering the joining position of the heater wire to the connector pin.

Here, when the vehicle exterior part is assembled to the vehicle and is placed in an environment in which the temperature changes repeatedly, the waterstop portion and the heater wire expand and contract according to the temperature change.

In this regard, the above configuration uses the potting material to form the waterstop portion. The potting material is made of a soft resin material. Therefore, stress is less likely to be concentrated on the boundary between the joining portion and the heater wire regardless of a difference in linear expansion coefficient between the heater wire and the waterstop portion. Therefore, the joining state of the heater wire to the connector pin is maintained favorably, which can prevent disconnection.

According to an aspect of the present specification, a vehicle exterior part includes; a decorative body configured to decorate a vehicle; a heater sheet including a heater wire configured to generate heat when energized, the heater wire being wired on an interior surface of a sheet base material; and a connector pin configured to be coupled with a device for power supply. The decorative body includes a base material and a transparent resin layer disposed on an exterior side from the base material. The heater sheet includes a heat generating body disposed on an exterior side from the transparent resin layer and an extending portion extending from a peripheral edge of the heat generating body and disposed on an interior side from the transparent resin layer. A part of the heater wire in the extending portion is joined to the connector pin inside the outer periphery of the base material by a joining portion made of a conductive material. The outer periphery is formed with a window configured to join the heater wire to the connector pin by the joining portion. The window is formed in a state where a joining position is exposed to an outside of the outer periphery. The window is provided with a waterstop portion configured to restrict water from entering the joining position. The waterstop portion includes a cover formed of a resin material. The cover is arranged with a gap from the joining position, and blocks the window in close contact with a peripheral edge of the window, the window being on an exterior side from the gap.

According to the above configuration, the waterstop portion which blocks the window includes the cover formed of a resin material. The waterstop portion blocks the window in close contact with the peripheral edge of the window. Therefore, the waterstop portion can restrict water from the outside of the window from entering the joining position of the heater wire to the connector pin.

Here, when the vehicle exterior part is assembled to the vehicle and is placed in an environment in which the temperature changes repeatedly, the waterstop portion and the heater wire expand and contract according to the temperature change.

In this regard, according to the above configuration, the waterstop portion includes the resin cover. The cover is arranged with a gap from the joining position by the joining portion of the heater wire to the connector pin. The cover is not in direct contact with the joining portion and the connector pin. Therefore, stress is less likely to be concentrated on the boundary between the joining portion and the heater wire regardless of a difference in linear expansion coefficient between the heater wire and the waterstop portion. Therefore, the joining state of the heater wire to the connector pin is maintained favorably, which can prevent disconnection.

The waterstop portion including the cover is separated from the joining position. Therefore, the joining position is not pressed by the waterstop portion, which prevents a risk that the joining of the heater wire to the connector pin is disconnected due to pressing.

In the vehicle exterior part, it is preferable that the waterstop portion is welded to the peripheral edge of the window.

According to such configuration, the waterstop portion is welded to the peripheral edge of the window, so that the waterstop portion and the peripheral edge of the window are joined to each other in a molten state. Therefore, the welded portion can restrict intrusion of water from the outside to the inside of the window.

The vehicle exterior part can favorably maintain the joining state of the heater wire to the connector pin even when the ambient temperature changes repeatedly.

DESCRIPTION OF EMBODIMENTS

First Embodiment

Hereinafter, a first embodiment in which a vehicle exterior part is embodied as an emblem to be attached to a front portion of a vehicle will be described with reference to FIGS. 1 to 5.

In the following description, a forward direction of the vehicle is referred to as front, and a backward direction is referred to as rear. An upper-lower direction refers to an upper-lower direction of the vehicle. A left-right direction refers to a vehicle width direction and coincides with a left-right direction when the vehicle moves forward. The drawings are illustrated with a scale of the parts of the emblem changed appropriately so that the parts can be recognized.

Figure 3:
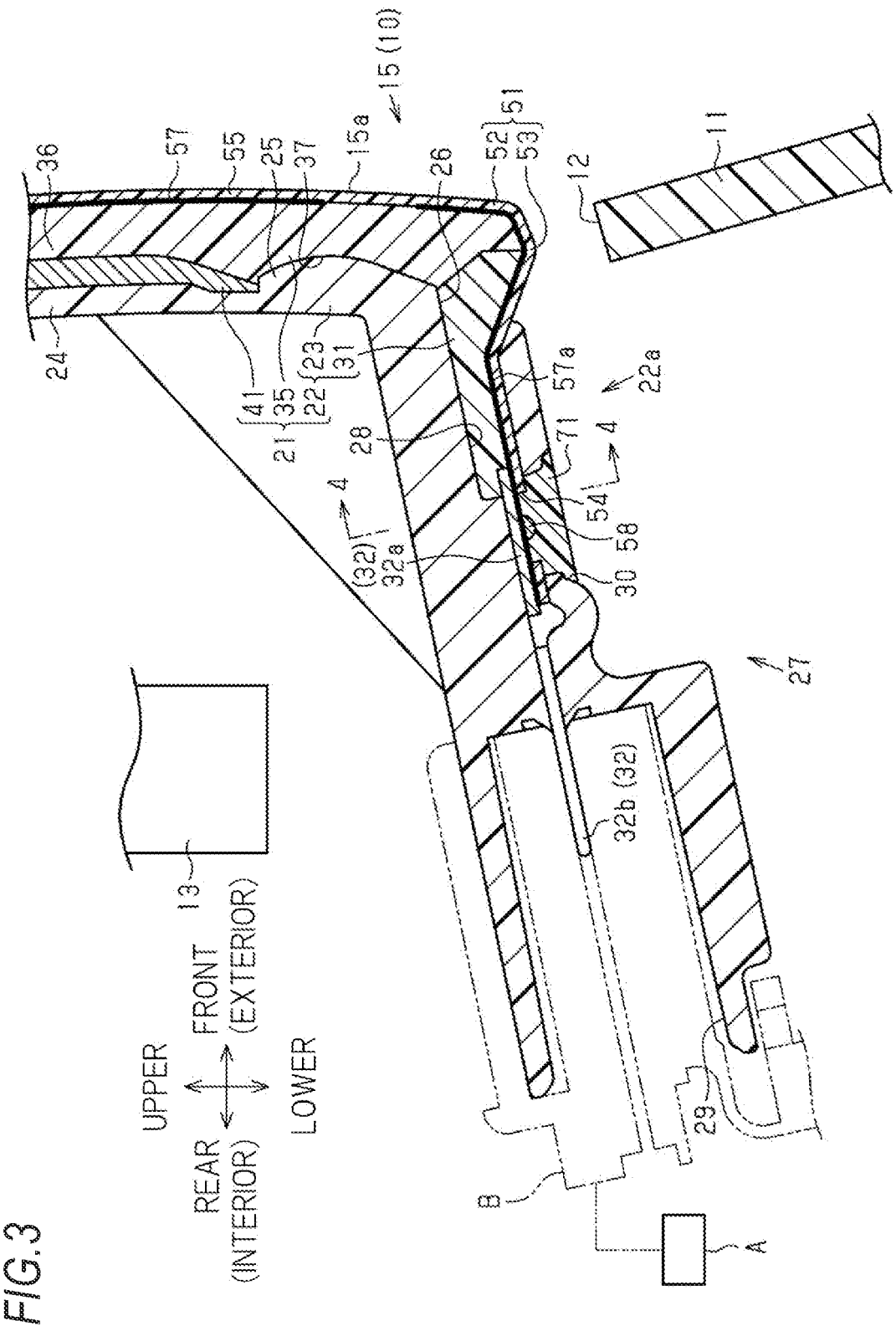
FIG. 3 is a partial side cross-sectional view illustrating a lower structure of the emblem together with a part of a front grille and a part of a millimeter wave radar device according to the first embodiment.

As illustrated in FIG. 3, a millimeter wave radar device 13 for forward monitoring is disposed at a central portion in the vehicle width direction of a front portion of a vehicle 10 and behind a front grille 11. The millimeter wave radar device 13 has a function of transmitting a millimeter wave among electromagnetic waves to the front of the outside of the vehicle and receiving a millimeter wave reflected by an object outside the vehicle. The millimeter wave refers to a radio wave having a wavelength of 1 mm to 10 mm and a frequency of 30 GHz to 300 GHz.

The front grille 11 has a non-constant thickness as in the case of a general front grille. The front grille 11 may include a metal plating layer formed on an exterior surface of a resin base material. Therefore, the front grille 11 interferes with the transmitted or reflected millimeter wave. Therefore, the front grille 11 has a window 12 opened in front of the millimeter wave radar device 13 in a transmission direction of the millimeter wave. FIG. 3 illustrates a lower portion of the window 12.

The window 12 is provided with an emblem 15. The emblem 15 has a surface on the vehicle front side (right side in FIG. 3) which constitutes a design surface 15a. The design surface 15a has an elliptical outer shape which is horizontally long. Here, when describing the emblem 15, a side facing the design surface 15a is referred to as an exterior side, and a side opposite to the design surface 15a (the left side in FIG. 3) is referred to as an interior side.

The emblem 15 is disposed in an upright state. In this state, the exterior side of the emblem 15 corresponds to the front side of the vehicle 10, and the interior side of the emblem corresponds to the rear side of the vehicle 10.

Therefore, when describing the emblem 15 alone, the terms "exterior" and "interior" are used for specifying directions corresponding to the front and rear directions of the vehicle. The same applies to a case of describing the emblem 15 when the emblem 15 is attached to the vehicle 10.

The emblem 15 includes a decorative body 21 and a heater sheet 51. Next, members constituting the emblem 15 will be described.

<Decorative Body 21>

Figure 1:
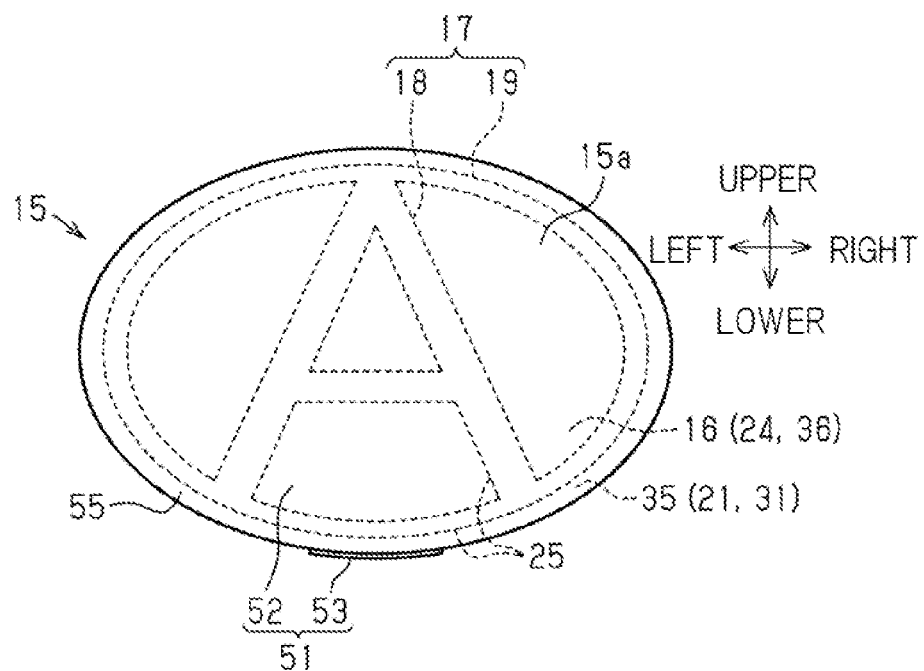
FIG. 1 illustrates a front view of a first embodiment, which is a vehicle exterior part embodied as an emblem.

As illustrated in FIGS. 1 and 3, the decorative body 21 is a portion for decorating the vehicle 10 and is disposed on the front side of the vehicle 10 in the direction for transmitting the millimeter wave from the millimeter wave radar device 13. A main portion of the decorative body 21 has a substantially elliptical plate shape which is horizontally long, which corresponds to the design surface 15a of the emblem 15, and has millimeter wave transparency.

The decorative body 21 includes a base material 22, a transparent resin layer 35, and a decorative layer 41. The base material 22 is a member constituting an interior portion of the decorative body 21. The base material 22 includes a base material body 23 constituting a skeleton portion of the base material 22, and a frame 31 provided on an outer periphery of the base material body 23.

The base material body 23 is formed of acrylonitrile-ethylene-styrene copolymer (AES) resin in a colored manner. An exterior portion of the base material body 23 is formed with a substantially flat general portion 24 intersecting an exterior-interior direction in a state close to being orthogonal thereto, and a protrusion 25 protruding more exterior than the general portion 24. The general portion 24 corresponds to a background region 16 of the emblem 15 in FIG. 1, and the protrusion 25 corresponds to a pattern region 17 of the emblem 15. Here, the pattern region 17 includes a character portion 18 of "A" and an annular portion 19 around the character portion 18.

As illustrated in FIG. 3, an outer periphery of the base material body 23 is formed with an annular recess 26 which is opened in the exterior surface thereof and recessed toward the interior side. The annular recess 26 has a substantially elliptical annular shape corresponding to the peripheral edge of the base material body 23.

The base material 22 has, in a lower portion thereof, a socket portion 27 protruding toward the interior side. The socket portion 27 is a portion for inserting and removing a plug portion B of the device A for power supply. An exterior portion of the socket portion 27 is formed with a recess 28 extending toward the interior side from the annular recess 26. Further, the socket portion 27 is formed with a recess 29 which is opened in an interior surface thereof and recessed toward the exterior side.

Instead of AES resin, the base material body 23 may be formed of acrylonitrile-styrene-acrylate copolymer (ASA) resin, polycarbonate (PC) resin, a polymer alloy of PC resin and acrylonitrile-butadiene-styrene copolymer (ABS) resin, or the like.

The frame 31 is provided along the outer periphery of the base material body 23 to form a substantially elliptical annular shape (see FIG. 1). A majority part of the frame 31 is filled in the annular recess 26. A part of a lower portion of the frame 31 is filled in the recess 28 of the socket portion 27. The frame 31 is formed of, for example, a mixed material of PC resin and carbon black, and has a black color.

Figure 4:
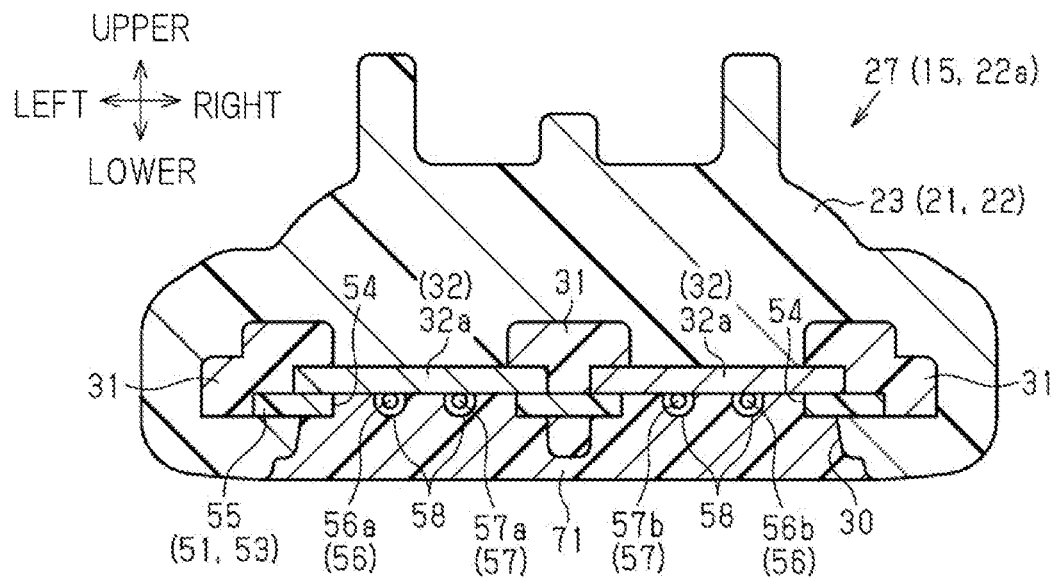
FIG. 4 is a cross-sectional view of a socket section taken along line 4-4 of FIG. 3.

As illustrated in FIGS. 3 and 4, the socket portion 27 is provided with two connector pins 32 extending in the exterior-interior direction in a state of being separated from each other in the left-right direction. Each connector pin 32 has an exterior portion 32a formed in a flat plate shape and embedded in the base material body 23 and the frame 31. Further, each connector pin 32 has an interior portion 32b having a rod shape. The portion 32b is partially arranged in the recess 29.

A part of the outer periphery 22a of the base material 22 which is below the socket portion 27 is formed with a window 30 which is opened in a lower surface of the socket portion 27. The window 30 is provided for joining heater wires 56, 57, which will be described later, to the connector pin 32.

A peripheral edge of the interior surface of the base material 22 (base material body 23) is provided with attachment portions (not illustrated) for attaching the emblem 15 to the front grille 11 or the vehicle body at plural positions. Each attachment portion is configured with a clip, a screw, an engagement claw, or the like.

As illustrated in FIGS. 1 and 3, the transparent resin layer 35 is a member constituting an exterior portion of a main portion of the decorative body 21. The transparent resin layer 35 is formed of PC resin so as to be transparent. The term "transparent" as used herein includes not only colorless and transparent, but also colored and transparent. The same applies to a sheet base material 55 to be described later. An interior portion of the transparent resin layer 35 is formed in a shape corresponding to the shape of the exterior portion of the base material body 23. That is, a portion on the interior side of the transparent resin layer 35 that is on the exterior side of the general portion 24 of the base material body 23 is formed with a substantially flat general portion 36 intersecting the exterior-interior direction in a state close to being orthogonal thereto. A portion on the interior side of the transparent resin layer 35 that is on the exterior side of the protrusion 25 of the base material body 23 is formed with a recess 37 recessed more exterior than the general portion 36. An outer periphery of the transparent resin layer 35 is located on the exterior side of the frame 31. The transparent resin layer 35 may be formed of a transparent resin such as polymethyl methacrylate (PMMA) resin instead of the PC resin.

The decorative layer 41 is formed in a region surrounded by the frame 31 between the base material body 23 and the transparent resin layer 35, and has millimeter wave transparency. The decorative layer 41 is constituted by, for example, a combination of a colored decorative layer having a dark color such as black or blue and a bright decorative layer made of a metal material such as indium (In).

In the decorative body 21, the frame 31 is welded to the base material body 23 and the transparent resin layer 35, so as to couple the base material body 23 and the transparent resin layer 35 to each other.

In the decorative body 21, a region for transmitting millimeter wave has a constant thickness.

<Heater Sheet 51>

Figure 2:
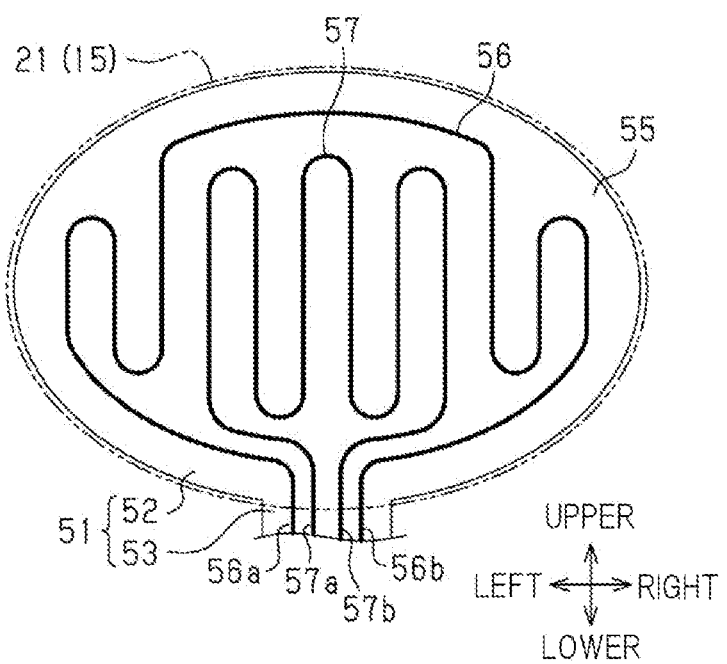
FIG. 2 is a partial rear view illustrating a part of a heater sheet together with a decorative body according to the first embodiment.

As illustrated in FIGS. 2 and 3, the heater sheet 51 includes a sheet base material 55 and two heater wires 56, 57. The sheet base material 55 is formed of a transparent resin material such as PC resin. Each of the heater wires 56, 57 is made of a metal material which generates heat when energized, and is wired on the interior surface of the sheet base material 55.

The heater sheet 51 includes a heat generating body 52, and an extending portion 53 extending from a peripheral edge of the heat generating body 52, that is, a lower edge in the first embodiment. A direction in which the extending portion 53 extends from the heat generating body 52 is referred to as an extending direction of the extending portion 53. A direction orthogonal to the extending direction along a surface of the extending portion 53 is referred to as a width direction of the extending portion 53. The heat generating body 52 is formed in a horizontally long elliptical shape corresponding to the design surface 15a of the emblem 15. The heat generating body 52 is laminated on the exterior side of the transparent resin layer 35. In the heat generating body 52, the heater wires 56, 57 are wired in different wiring patterns (see FIG. 2).

The extending portion 53 is bent along a lower surface of the transparent resin layer 35, a lower surface of the frame 31, and the like, so as to go around the transparent resin layer 35 on the interior side via a lower end portion of an outer periphery of the decorative body 21.

As illustrated in FIGS. 3 and 4, each side portion of the extending portion 53 in the width direction is formed with an opening 54. The openings 54 are spaced apart from each other in the width direction.

As illustrated in FIGS. 2 to 4, the two heater wires 56, 57 are wired not only in the heat generating body 52, but also in the extending portion 53. That is, the heater wire 56 has terminals 56a, 56b at both end portions thereof. The heater wire 57 has terminals 57a, 57b at both end portions. The terminals 56a, 57a are collectively wired on one side portion in the width direction on the interior surface of the extending portion 53. The terminals 56a, 57a each partially intersect with one opening portion 54 in the extending direction. Similarly, the terminals 56b, 57b are collectively wired on the other side portion in the width direction on the interior surface of the extending portion 53. The terminals 56b, 57b each partially intersect with the other opening portion 54 in the extending direction.

As illustrated in FIGS. 3 and 4, the part of the extending portion 53 which goes around to the interior side via the lower end portion of the outer periphery of the decorative body 21 is arranged between an outer peripheral surface of the frame 31 and an inner wall surface of the recess 28.

The exterior portion 32a of each connector pin 32 partially overlaps a part of the extending portion 53 that is a periphery of the opening 54 from the exterior side (outer peripheral side). The terminals 56a, 57a are soldered in the one opening 54, so as to be joined to the exterior portion 32a. Similarly, the terminals 56b, 57b are soldered in the other opening 54, so as to be joined to the exterior portion 32a. In FIGS. 3 and 4, reference numeral 58 denotes a joining portion made of a solder alloy and formed by soldering. These joining portions 58 electrically connect the terminals 56a, 56b and the terminals 57a, 57b to the exterior portions 32a of the connector pins 32 inside the outer periphery 22a of the base material 22.

The joining may be performed by adhesion using a conductive adhesive, welding, or the like, instead of soldering.

Portions where the terminals 56a, 56b and the terminals 57a, 57b are joined to the connector pins 32 by the joining portions 58 are referred to as joining positions. The window 30 is provided with a waterstop portion 71 for restricting water from entering the joining positions. In the first embodiment, the waterstop portion 71 is formed by filling the window 30 with a resin material softer than the base material 22. The resin material is a potting material. Here, the potting material is generally a filling material for filling an entire electric circuit for the purpose of protecting the electric circuit or the like from impact, vibration, moisture, or corrosion, and is rubber-like, gel-like, etc. The potting material may be, for example, an epoxy resin, an acrylic resin, a urethane resin, a silicone resin, or the like. The waterstop portion 71 is in direct contact with the joining positions.

As illustrated in FIG. 3, the emblem 15 configured as described above is disposed inside the window 12 in an upright state, and is attached to the front grille 11 or the vehicle body at the attachment portion.

The plug portion B of the device A is inserted into the recess 29 of the socket portion 27 from the interior side of the emblem 15, so that the heater wires 56, 57 are electrically connected to the device A.

Next, an operation of the first embodiment configured as described above will be described. An effect produced by the operation will be described together.

Figure 5:
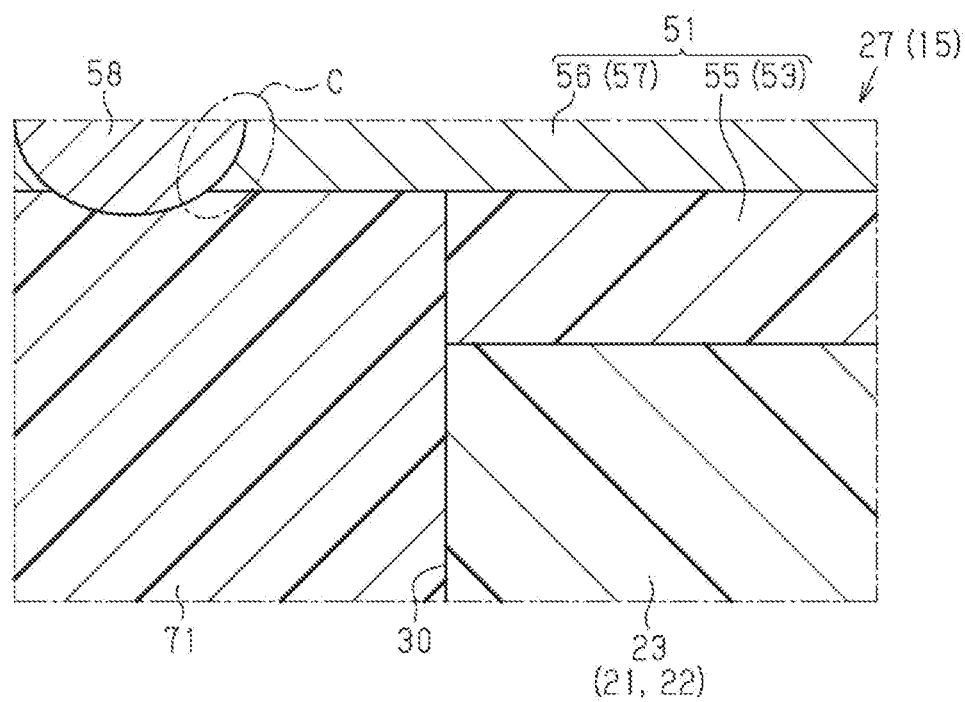
FIG. 5 is a partial cross-sectional view illustrating a joining position of a heater wire by a joining portion together with a periphery thereof according to the first embodiment.

As illustrated in FIGS. 3 to 5, in the emblem 15 of the first embodiment, the window 30 is formed in the outer periphery 22a of the base material 22, and water may enter the joining positions between the terminals 56a, 56b, the terminals 57a, 57b and the connector pins 32 from the window 30. However, the window 30 is blocked by the waterstop portion 71. The waterstop portion 71 is formed by filling the window 30 with a potting material made of a soft resin material. The potting material is in close contact with a wall surface of the window 30. The waterstop portion 71 and the wall surface have no or almost no gap therebetween. Therefore, the waterstop portion 71 can restrict the water from entering the joining positions from the outside of the window 30.

Here, when the emblem 15 assembled to the vehicle 10 is placed in an environment in which the ambient temperature changes repeatedly, the waterstop portion 71, the terminals 56a, 56b, and the terminals 57a, 57b expand and contract according to the temperature change. If the waterstop portion 71 is formed of a hard resin material such as AES resin and PC resin similarly to the base material 22, the following phenomenon occurs when the waterstop portion 71 expands and contracts more than the terminals 56a, 56b and the terminals 57a, 57b due to a difference in linear expansion coefficient between the heater wires 56, 57 and the waterstop portion 71. That is, stress is concentratedly applied to a boundary C between the joining portions 58 and the terminals 56a, 56b, the terminals 57a, 57b. As a result, the joining of the terminals 56a, 56b and the terminals 57a, 57b to the connector pins 32 by the joining portions 58 may be released, which causes disconnection.

In this regard, in the first embodiment, the potting material, which is a resin material softer than the base material body 23 and the frame 31, is used as the material of the waterstop portion 71. The potting material is filled in the window 30 to form the waterstop portion 71. Therefore, stress is less likely to be concentrated on the boundary C regardless of the difference in linear expansion coefficient between the heater wires 56, 57 and the waterstop portion 71. Therefore, the connection state of the terminals 56a, 56b and the terminals 57a, 57b to the connector pins 32 can be maintained favorably, thereby preventing disconnection.

When ice and snow adhere to the design surface 15a of the emblem 15, as illustrated in FIG. 3, electric power is supplied to the heater wires 56, 57 via the plug portion B of the device A and the connector pins 32. The heater wires 56, 57 generate heat when energized. The heat generated by the heater wires 56, 57 is partially transmitted to the design surface 15a of the emblem 15. This heat melts the ice and snow adhering to the design surface 15a, and prevents attenuation of millimeter wave due to the ice and snow.

In particular, in the first embodiment, the heater sheet 51 is disposed at a most exterior position in the emblem 15. Therefore, the heat generated by the heater wires 56, 57 is easily transmitted to the design surface 15a (exterior surface) of the emblem 15, and the ice and snow can be melted efficiently.

When millimeter wave is transmitted from the millimeter wave radar device 13, the millimeter wave sequentially passes through the base material body 23, the decorative layer 41, and the transparent resin layer 35 in the decorative body 21 of the emblem 15, and the heat generating body 52 of the heater sheet 51. The transmitted millimeter wave is reflected by an object in front of the vehicle including a preceding vehicle, a pedestrian, and the like, and then sequentially passes through the heat generating body 52 of the heater sheet 51, and the transparent resin layer 35, the decorative layer 41, and the base material body 23 in the decorative body 21. The millimeter wave transmitted through the decorative body 21 is received by the millimeter wave radar device 13. The millimeter wave radar device 13 recognizes the object and detects a distance, a relative speed, and the like between the vehicle 10 and the object based on the transmitted and received millimeter wave.

When the emblem 15 is irradiated with visible light from the front side of the vehicle 10, the visible light passes through the heat generating body 52 of the heater sheet 51 and the transparent resin layer 35 of the decorative body 21, and is reflected by the decorative layer 41. When the emblem 15 is viewed from the front side of the vehicle 10, the decorative layer 41 can be seen through the heat generating body 52 and the transparent resin layer 35 and appears to be positioned on the interior side thereof. In this way, the decorative layer 41 decorates the emblem 15, and improves the appearance of the emblem 15 and the periphery thereof.

The reflection of the visible light by the decorative layer 41 is performed in front of the millimeter wave radar device 13. The decorative layer 41 has a function of covering the millimeter wave radar device 13. Therefore, the millimeter wave radar device 13 can hardly be seen from the front side of the emblem 15. Therefore, the appearance of the millimeter wave radar device 13 is improved as compared with a case where the millimeter wave radar device 13 can be seen through the emblem 15.

According to the first embodiment, the following effects are obtained in addition to the above effects.

In the first embodiment, as illustrated in FIGS. 3 and 4, the one connector pin 32 and the terminals 56a, 57a are joined to each other inside the outer periphery 22a of the base material 22. The other connector pin 32 and the terminals 56b, 57b are also joined to each other inside the outer periphery 22a. The joining portions are covered with the outer periphery 22a. Therefore, unlike the case where the joining is performed on the exterior side of the transparent resin layer 35, the appearance is not deteriorated by the joining portions.

Second Embodiment

Figure 6:
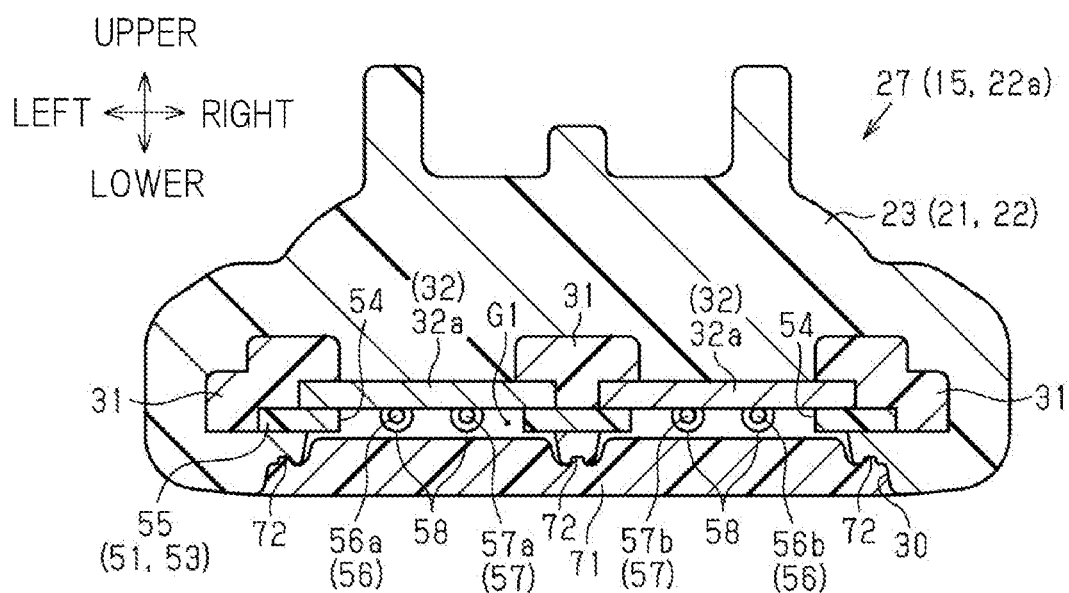
FIG. 6 illustrates an emblem according to a second embodiment, and is a cross-sectional view of a socket portion corresponding to FIG. 4.
Figure 7:
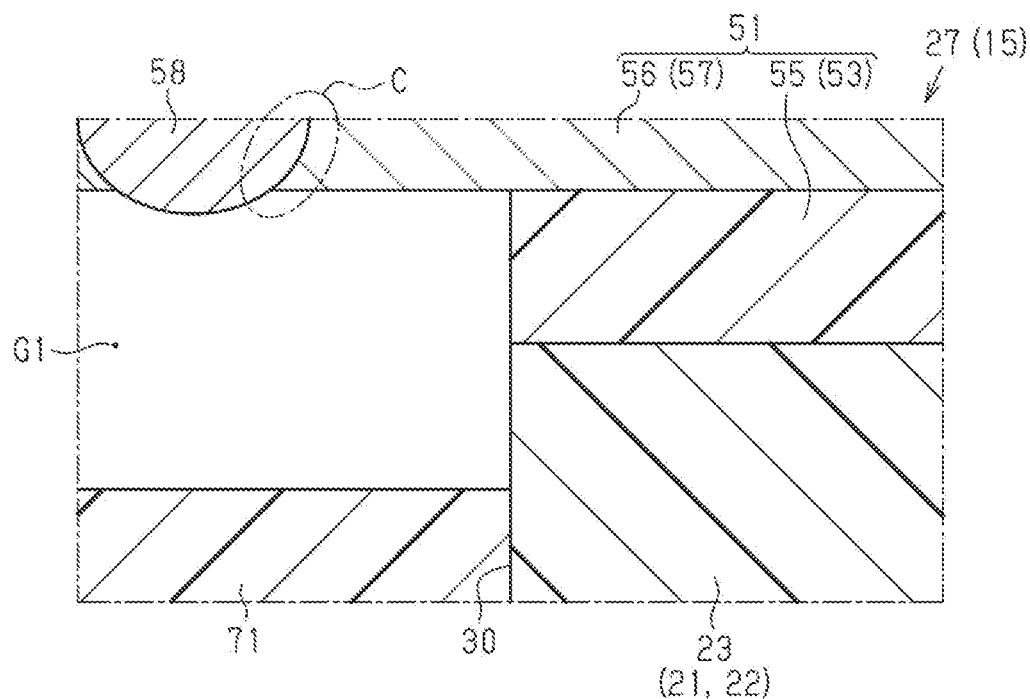
FIG. 7 is a partial cross-sectional view illustrating a joining position of a heater wire by a joining portion together with a periphery thereof according to the second embodiment.

Next, a second embodiment in which a vehicle exterior part is embodied as an emblem will be described with reference to FIGS. 6 and 7.

The second embodiment is different from the first embodiment in the configuration of the waterstop portion 71. The waterstop portion 71 includes a cover made of a hard resin material. In the second embodiment, the waterstop portion 71 is formed of AES resin similarly to the base material body 23.

The waterstop portion 71 is arranged with a gap G1 from the joining positions of the terminals 56a, 56b and the terminals 57a, 57b to the connector pins 32 by the joining portions 58. The waterstop portion 71 is welded to positions surrounding the joining positions in a peripheral edge 72 of the window 30 which is located on the exterior side (outer peripheral side) of the joining positions. The welding is performed by, for example, a welding method such as ultrasonic welding, laser welding, and hot plate welding.

The configuration other than the above is the same as that of the first embodiment. Therefore, the same elements as those described in the first embodiment are denoted by the same reference numerals, and redundant description thereof will be omitted.

Therefore, the same operation and effect as those of the first embodiment can also be obtained by the second embodiment. That is, in the emblem 15 of the second embodiment, the window 30 is blocked by the waterstop portion 71 formed using a hard resin material. The waterstop portion 71 is welded to the peripheral edge 72 of the window 30, so that the waterstop portion 71 and the peripheral edge 72 are joined to each other in a molten state. The waterstop portion 71 blocks the window 30 in close contact with the peripheral edge 72. Therefore, the waterstop portion 71 can restrict water from entering the joining positions from the outside of the window 30.

In the second embodiment, the waterstop portion 71 includes a resin cover, and the waterstop portion 71 is arranged with the gap G1 from the joining positions. Unlike the first embodiment, the waterstop portion 71 is not in direct contact with the joining positions. Therefore, stress is less likely to be concentrated on the boundary C between the joining portions 58 and the terminals 56a, 56b, the terminals 57a, 57b regardless of the difference in linear expansion coefficient between the heater wires 56, 57 and the waterstop portion 71. Therefore, the connection state of the terminals 56a, 56b and the terminals 57a, 57b to the connector pins 32 can be maintained favorably, thereby preventing disconnection.

The waterstop portion 71 is separated from the joining positions. Therefore, the joining positions are not pressed by the waterstop portion 71. The joining of the terminals 56a, 56b and the terminals 57a, 57b to the connector pins 32 by the joining portions 58 can be prevented from being released due to the pressing, thereby preventing disconnection.

The above embodiment may be modified into the modifications as follows. The above embodiment and the following modifications can be combined with each other to the extent that they are not technically contradictory to each other.

The number of the heater wires 56, 57 in the heater sheet 51 may be changed to one or three or more.

The extending portion 53 may extend from a position of the peripheral edge of the heat generating body 52 other than the lower edge thereof, for example, an upper edge, a side edge, or the like.

The outer shape of the design surface 15a of the emblem 15 may be changed to a shape other than the horizontally long elliptical shape.

The heater wires 56, 57 in the heat generating body 52 of the heater sheet 51 may be wired in a wiring pattern different from those in the first and second embodiments.

The vehicle exterior part can be applied as long as the vehicle exterior part is incorporated in a vehicle equipped with a device for transmitting and receiving electromagnetic wave for detecting an object outside the vehicle, and provided with a heater sheet on an exterior side of a decorative body. In this case, the electromagnetic wave transmitted and received by the device includes millimeter wave, infrared ray, and the like.

The device for transmitting and receiving electromagnetic wave for detecting an object outside the vehicle may be a device for rear monitoring, a device for front lateral side monitoring, or a device for rear lateral side monitoring, in addition to the device for front monitoring. In this case, the vehicle exterior part is disposed in front of the device in the transmission direction of the electromagnetic wave.

The vehicle exterior part may be incorporated in a vehicle without being equipped with a device for transmitting and receiving electromagnetic wave for detecting an object outside the vehicle.

The vehicle exterior part may be applied to a vehicle exterior part having a function of decorating a vehicle such as an ornament or a mark, in addition to the emblem.

What is claimed is:

1. A vehicle exterior part comprising:
a decorative body configured to decorate a vehicle;
a heater sheet including a heater wire configured to generate heat when energized, the heater wire being wired on an interior surface of a sheet base material; and
a connector pin configured to be coupled with a device for power supply, wherein:
the decorative body includes
a base material, and
a transparent resin layer disposed on an exterior side from the base material;
the heater sheet includes
a heat generating body disposed on an exterior side from the transparent resin layer, and
an extending portion extending from a peripheral edge of the heat generating body and disposed on an interior side from the transparent resin layer;
a part of the heater wire in the extending portion is joined to the connector pin inside an outer periphery of the base material by a joining portion made of a conductive material;
the outer periphery is formed with a window configured to join the heater wire to the connector pin by the joining portion in a state where a joining position is exposed to an outside of the outer periphery;
the window is provided with a waterstop portion configured to restrict water from entering the joining position; and
the waterstop portion is formed by filling the window with a potting material.

2. A vehicle exterior part comprising:
a decorative body configured to decorate a vehicle;
a heater sheet including a heater wire configured to generate heat when energized, the heater wire being wired on an interior surface of a sheet base material; and
a connector pin configured to be coupled with a device for power supply, wherein:
the decorative body includes
a base material, and
a transparent resin layer disposed on an exterior side from the base material;
the heater sheet includes
a heat generating body disposed on an exterior side from the transparent resin layer, and
an extending portion extending from a peripheral edge of the heat generating body and disposed on an interior side from the transparent resin layer;
a part of the heater wire in the extending portion is joined to the connector pin inside an outer periphery of the base material by a joining portion made of a conductive material;
the outer periphery is formed with a window configured to join the heater wire to the connector pin by the joining portion in a state where a joining position is exposed to an outside of the outer periphery;
the window is provided with a waterstop portion configured to restrict water from entering the joining position;
the waterstop portion includes a cover formed of a resin material; and
the cover is arranged with a gap from the joining position, and blocks the window in close contact with a peripheral edge of the window, the peripheral edge of the window being on an exterior side from the gap.

3. The vehicle exterior part according to claim 2, wherein the waterstop portion is welded to the peripheral edge of the window.

* * * * *